Sept. 16, 1958  P. A. SPERRY  2,852,252
SHEET MATERIAL FEED CONTROL MEANS AND METHOD
Filed June 13, 1952  3 Sheets-Sheet 1
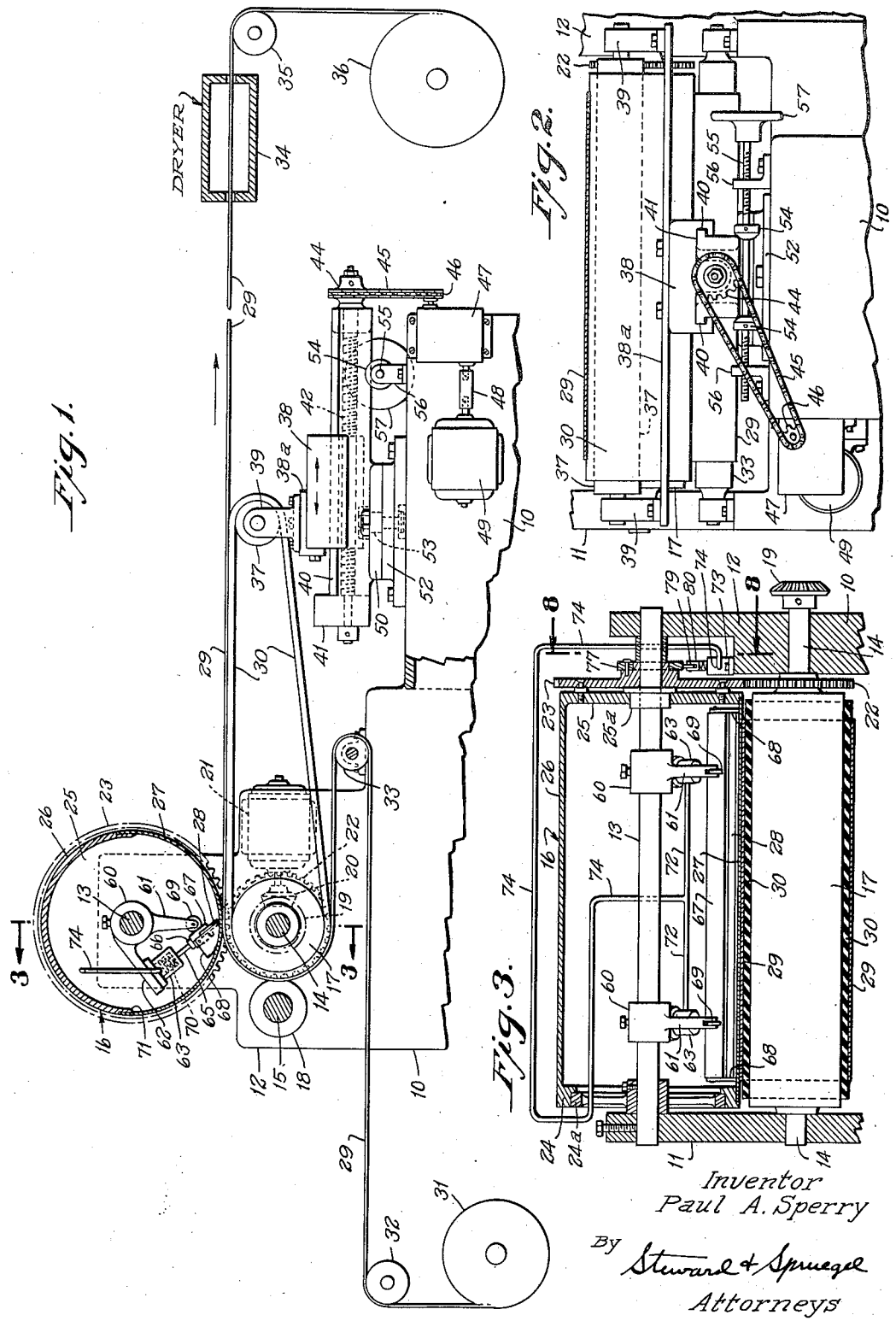
Inventor
Paul A. Sperry
By Steward & Spruegel
Attorneys

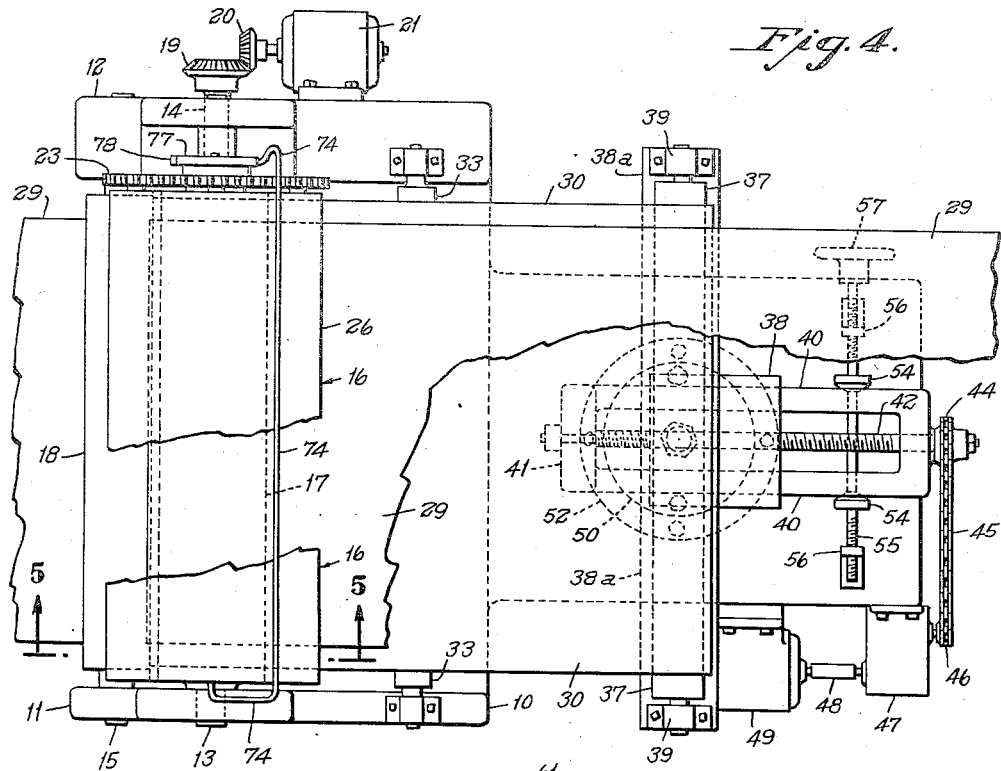
Fig. 4.
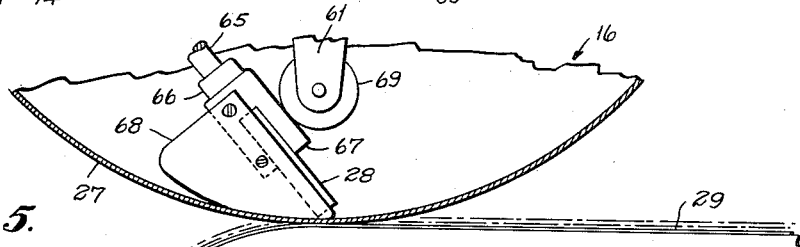
Fig. 5.
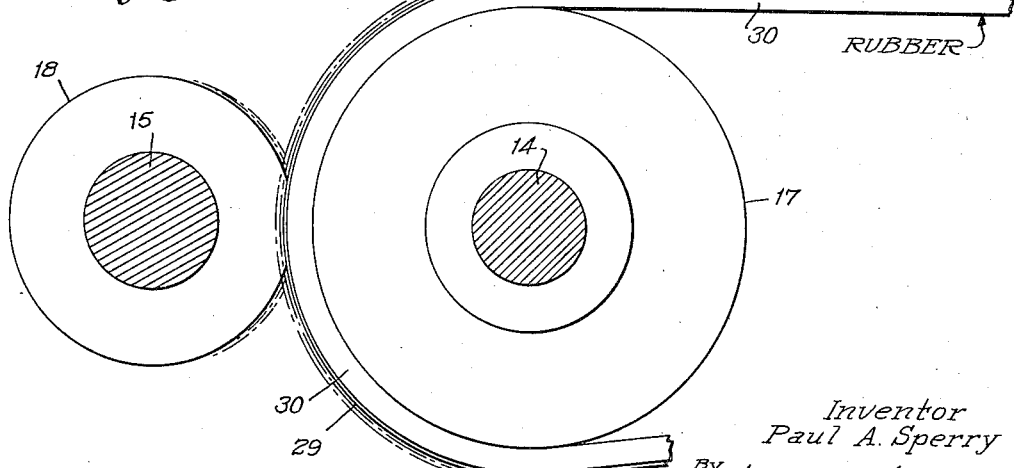
Inventor
Paul A. Sperry
By Steward & Spruegel
Attorneys

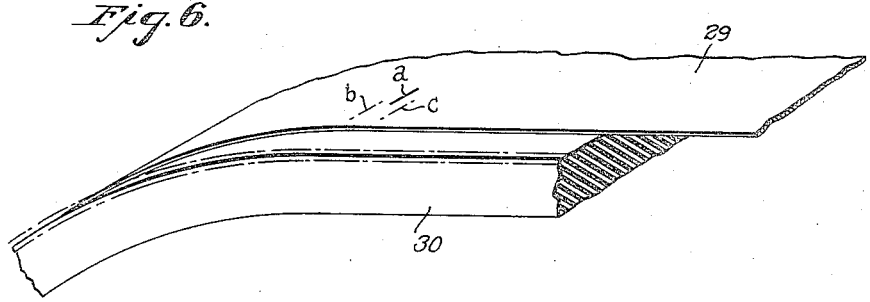
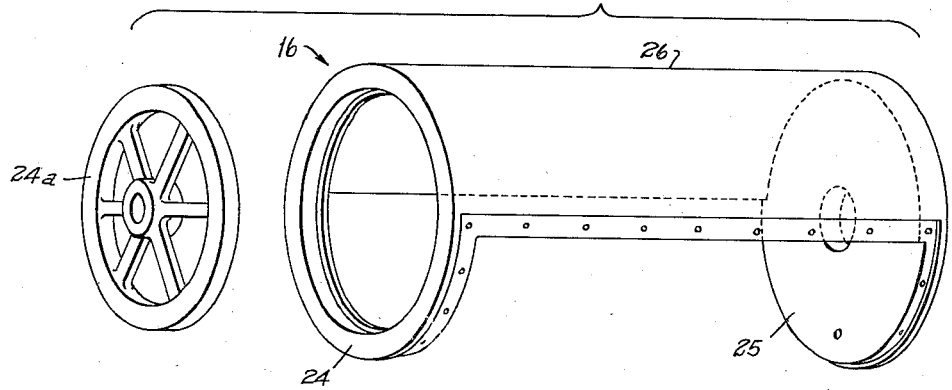
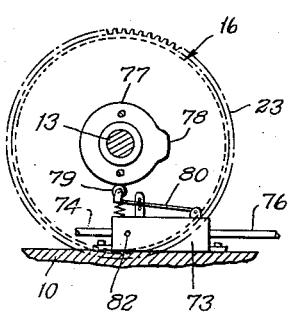
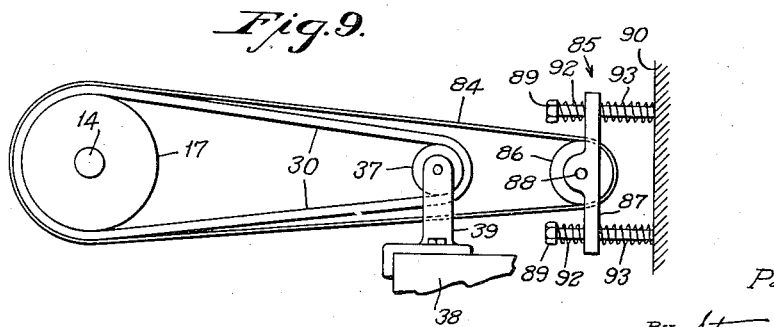
Inventor
Paul A. Sperry
By Steward & Sprugel
Attorneys

United States Patent Office 2,852,252
Patented Sept. 16, 1958

2,852,252

SHEET MATERIAL FEED CONTROL MEANS AND METHOD

Paul A. Sperry, New Haven, Conn.

Application June 13, 1952, Serial No. 293,257

8 Claims. (Cl. 271—2.1)

This invention relates to methods and apparatus for controlling the rate of feed of sheet material to a station at which an operation is to be performed on the material, and is particularly adapted to permit very close regulation of the feed rate of the material while the feeding is taking place. The present application is a continuation-in-part of copending application, Serial No. 224,155, filed May 2, 1951, by Paul A. Sperry, now abandoned.

The invention has particular utility in connection with rotary screen printing, fabric Sanforizing, web cutting and in similar operations where accurate control of the feed rate of the material being treated is of importance. In all of these operations means for broadly regulating feed rate are, of course, old and well-known. However, no practical means have been devised heretofore to permit very close regulation of the feed rate of a sheet material, during the treating operation, to compensate for slight changes in the length of the material caused by stretching or shrinkage.

For example, in rotary screen printing machines for stencil printing a multi-color pattern or design on sheet material there is a definite problem of accurately and closely controlling the feed rate of the material to insure proper registration of the successive color stencils relative to one another. The problem arises because each stencil must be thoroughly dried before the next one can be printed, and the drying and other necessary mechanical steps, plus ordinary changes in the ambient temperature and humidity, invariably cause uneven shrinkage or stretching throughout the material thereby making accurate registration of the successive stencils very difficult. The same basic problem also arises in connection with Sanforizing or fabric shrinkage control processes where, even though accurate registration is not a factor, close control must be maintained to accurately regulate the amount of overfeed of the fabric into the nipper drum or similiar processing equipment to obtain a uniform end product. In certain web cutting operations there is a problem of accurate registration similar to the registration problem in rotary screen printing. Thus, in web cutting, the feed rate of the material being cut must be carefully controlled so that the material is cut at exactly the right point on the web. This is important in cutting the material into uniform lengths, and is particularly so when a series of labels or advertisements have been previously printed upon the material and the cut must occur between the labels of the series and not through them. Here again, uneven shrinkage or stretching throughout the material may make the problem of accurate registration of the material relative to the cutting station a very difficult one.

Heretofore, the problems noted above have been partially solved by a rather laborious method which consists in taking packing from or adding packing to one or more of the feed controlling rolls or cylinders to regulate the feed rate of the material driven by the rolls relative to the rotational speed thereof. This is largely a trial and error method and frequently results in a considerable waste of material before the correct solution is found. Furthermore, the processing apparatus must be shut down each time a change in the packing is affected which means that there is a loss of productive working time and a consequent lowering of the overall efficiency of the operation. Since there may be many variations in characteristics throughout the length of a given piece of sheet material, operations may have to be interrupted several times during the treatment of the material unless an unsatisfactory product is to result.

In order to solve the aforementioned problems, the present invention provides a practical and efficient method for permiting very close control of the rate of feed of the sheet material being treated while the feeding is taking place, and further provides an apparatus particularly adapted to carry out this method in connection with such operations as rotary screen printing, Sanforizing, web cutting and the like. The method consists in mechanically varying the effective diameter of a rotating feed controlling roll to vary the linear speed or rate of feed of a sheet material carried by the roll. This is accomplished by passing an endless, elastic blanket or belt around the roll and causing the blanket to expand or contract to vary the thickness thereof. This varies the outer diameter of the rotating roll and hence varies the linear speed of the material carried on the periphery or a portion of the periphery of the roll. As provided for by the invention the permissible variation in blanket thickness is relatively large and can be effected as necessary during the operation of the treating apparatus. In addition to having utility in the previously mentioned operations, the method and apparatus of this invention can be used in such operations as offset printing to control the length of the print image by varying the effective diameter of the plate or impression cylinders. The invention can also be used in connection with other similar operations as will be apparent to those skilled in the art in reading the following detailed description.

With the foregoing and other considerations in view, it is a primary object of this invention to provide a practical and efficient method, and apparatus for carrying out the method, which permit very close regulation of the feed rate of sheet material to a station at which an operation is to be performed on the material.

Another important object of the invention is to provide a method and apparatus for accurately controlling the feed rate of sheet material to a particular point at an operating station while the feeding is taking place.

A further important object of the invention is to provide a method and apparatus for controlling the linear speed or rate of feed of sheet material by varying the effective diameter of a rotating feed controlling roll carrying the material.

A still further object of the invention is to provide a method and apparatus for varying the effective diameter of a feed controlling roll by means of an elastic blanket passing over the roll.

Another object of the invention is to provide an apparatus for closely regulating the effective diameter of a feed controlling or similar roll, which apparatus is of simple, durable and economical construction.

A further object of the invention is to provide a rotary screen printing apparatus having very accurate control means for insuring proper registration of successive stencils in the printing of a multi-color stencil design.

Still another object of the invention is to provide an improved means for insuring proper registration in web cutting processes, enabling close feed control in sanforizing processes, or controlling the length of the print image in offset printing processes.

Other objects and advantages of the invention will become apparent from the following detailed description read in conjunction with the accompanying drawing and appended claims. In the drawings, wherein like reference numerals are used to designate like parts throughout, the invention is illustrated as it might advantageously be applied to a rotary screen printing operation.

In the drawings:

Figure 1 is a diagrammatic side elevation of a single-drum rotary screen printing apparatus, partly in section, embodying the feed rate and registration control means of the invention;

Figure 2 is a broken right-end elevation of the printing apparatus of Figure 1;

Figure 3 is a longitudinal section through the screen drum and impression roll of the apparatus, taken along line 3—3 of Figure 1;

Figure 4 is a plan view of the apparatus of Figure 1 with certain parts broken away to show details of the control means of the invention;

Figure 5 is an enlarged longitudinal section through a portion of the apparatus, taken along line 5—5 of Figure 4;

Figure 6 is an enlarged, fragmentary perspective view of the elastic blanket and sheet material supported thereon;

Figure 7 is an enlarged, exploded perspective view of the screen drum of the printing apparatus;

Figure 8 is a side elevation of the cam and valve mechanism for controlling the squeegee operation, taken in the direction of line 8—8 of Figure 3; and Figure 9 is a fragmentary side elevation of a modified form of the control means of the invention.

Rotary screen printing machines for printing bas-relief designs on sheet material such as paper, fabric, plastic, leather and the like fall into two broad classes, namely, those which print but a single stencil bas-relief design in a single pass of the sheet material through the machine, and those which print a multi-stencil bas-relief design in a single pass of the material through the machine. In the latter type of machine, it is necessary to thoroughly dry each stencil impression as the material travels from one screen drum to the next, and, consequently, machines of this type are of relatively great length.

The single stencil type of printing machine employs but one screen drum, but may be used to print a multi-stencil, or multi-color, bas-relief design by passing the sheet material through the machine once for each stencil used to make up the multi-stencil design, the individual stencils of the design being obtained by changing the stencil on the screen drum after each pass of the material through the machine.

While both types of rotary screen printing machines require close control of the feed rate of the sheet material to insure proper stencil registration, the problem is aggravated in the single stencil machine because of the greater chance for uneven stretch or shrinkage in the material and the mechanical difficulties of rewinding it into a uniformly tight roll after each pass through the machine. Accordingly, the invention is shown as applied to a single stencil type of machine for the purposes of illustration.

Referring now to the drawing, the machine is provided with a base indicated generally at 10 having adjacent its left hand end, as seen in Fig. 1, two upstanding side panels 11, 12 which extend upwardly substantially perpendicularly from the top of the base 10 at opposite sides thereof, as indicated in Figs. 3 and 4. Each side panel is provided with a plurality of apertures extending transversely therethrough and in alignment with the corresponding apertures of the opposite side panel of the base for supporting the opposite ends respectively of the shafts 13, 14 and 15 which rotatably support the screen drum 16, the impression roll 17 and the pressure roll 18, respectively.

Both the screen drum 16 and the pressure roll 18 are driven by the rotation of the impression roll 17 which is the drive roll of the assembly. To this end, one end of the shaft 14 of the impression roll is extended beyond the side panel 12 and provided at its outer end with a beveled pinion 19 adapted to mesh with a beveled pinion 20 secured to one end of the shaft of the drive motor 21. The screen drum 16 is driven directly from the impression roll 17 by a ring gear 22 secured to one end of the latter and adapted to mesh with a plate gear 23 secured to the corresponding end of the screen drum.

The screen drum 16, sometimes referred to as the stencil drum or stencil cylinder, may be of any suitable construction and as illustrated herein comprises a ring member 24 and a centrally apertured solid disc member 25 held in spaced parallel relationship by a substantially semi-circular drum wall 26 which, as is best shown in Figs. 3 and 7, is joined integrally at its opposite ends to the members 24, 25. Ring member 24 rotates upon a stationary spider or bearing 24a, while disc member 25 rotates upon a smaller bearing 25a, both of said bearings being fixed on stationary shaft 13 as shown in Fig. 3. The particular stencil screen 27 for the stencil to be printed is also of substantially semicircular shape when secured to the screen drum so that it complements the drum wall 26 to form therewith a cylindrical drum surface. The stencil screen 27 may be of fine mesh wire, silk or some similar material.

As is characteristic of such stencil screens, each screen 27 has permeable and impermeable areas disposed thereover to form a stencil of a predetermined design, the ink or colored pigment to be used in printing the stencil being forced through the permeable areas of the screen by means of a squeegee blade 28. The latter is secured against rotation on the shaft 13 of the screen drum and its edge makes a substantially uniform line contact with the inner surface of the screen throughout the length thereof, as may be best seen in Fig. 3. The squeegee blade 28 may be provided with mechanical means to raise and lower it to clear the thicker drum wall 26, as will be more fully described hereinafter. Since the machine is particularly adapted to print successive stencils of a multi-stencil or composite design on the sheet material by successive runs of the latter through the machine, each stencil screen 27 is preferably constructed so as to facilitate attachment to and detachment from the fixed elements of the rotatable screen drum, whereby several stencil screens having the individual stencils making up the composite design, may be used selectively with facility and dispatch. To this end, each stencil screen 27 is preferably provided with metal reinforcing strips which extend across the ends and along the sides of the screen, the strips having suitable fastening means for detachably securing the screen to the fixed elements of the rotatable screen drum.

The sheet material to be printed is indicated generally at 29 and is adapted to be moved beneath the screen drum 16 for stenciling by supporting means including the pressure roll 18 and an endless, variable thickness member or elastic blanket 30, one end of which is engaged around the impression roll 17 so that the rotation of the roll drives the blanket. The pressure roll 18 is of relatively soft resilient material as, for example, sponge rubber or the equivalent, and is mounted in juxtaposition to and forms a bite with that end of the elastic blanket 30 which is passed around the impression roll 17, whereby movement of the blanket serves to pull the sheet material 29 off of a supply roll 31, over the idler rolls 32, 33 and over the blanket for passage beneath the screen drum, at which point a stencil may be applied in bas-relief to the surface of the material. After passing beneath the screen drum, the material 29 may be drawn through a dryer which is indicated generally at 34, and from thence over an idler pulley 35 to the wind-up roll 36 which is positively rotated to wind up the stenciled material.

As mentioned above, the elastic or extensible blanket 30 serves to move the sheet material beneath the stenciling drum and in this respect constitutes one important element of the material feed rate and stencil registration control means of the apparatus of the invention. The right-hand portion of elastic blanket 30, Fig. 1, passes around an idler roll 37, and in the normal or median operating condition of the apparatus, roll 37 is so positioned that the blanket 30 is under a moderate tension, hereinafter referred to as the normal tension. The width of blanket 30 is substantially equal to the length of the impression roll 17 so as to provide a surface of ample width for supporting the sheet material 29. Moreover, the blanket 30 is relatively thick, as indicated in Figs. 5 and 6, and may be formed of rubber or a rubber-like material which can be vulcanized or otherwise treated so that the blanket has a relatively hard or firm surface, as compared to the relatively soft surface of the pressure roll 18. From its condition of normal tension, the blanket is capable of being considerably elongated or stretched before reaching its elastic limit, and the elongation of the blanket will be accompanied by a substantial reduction in its effective thickness. Conversely, when the blanket is allowed to contract from its condition of normal tension to its relaxed condition, the contraction of the blanket will be accompanied by a substantial increase in its effective thickness, as indicated by the broken lines in Fig. 5.

In the specific embodiment of the invention illustrated herein by way of example, the means for applying a force to the blanket 30 in the direction of its longitudinal axis to effect a change in its length comprises a carriage 38 supporting a cross bar 38a on which are mounted upstanding brackets 39 which support the opposite ends of idler roll 37. The carriage 38 is supported for longitudinal sliding movement on ways 40—40 of a substantially horizontally disposed supporting member 41 having axially aligned bearing apertures at opposite ends thereof to rotatably support a screw 42. Screw 42 is engageable with an axially aligned internally threaded aperture of the carriage 38, so that rotation of the screw in one direction will move the carriage in a corresponding direction along the ways 40—40 of the supporting member, while rotation of the screw in the opposite direction will move the carriage in the opposite direction along the ways of the member. The screw 42 extends beyond its end-bearing in the member 41, Figs. 1 and 4, and has a sprocket 44 secured to its outer end. Sprocket 44 is connected by a chain 45 to a sprocket 46 of a speed-reduction gear box 47 connected by a flexible coupling 48 to the shaft of a reversible motor 49. By selective operation of the motor switch, not shown, the direction and exact amount of movement of carriage 38 can be easily controlled as will be more fully discussed hereinafter.

The longitudinal axis of the aforesaid member 41 is substantially perpendicular to the axis of the idler roll 37, and lies in a horizontal plane substantially parallel to the horizontal plane of the sheet material supporting surface of the blanket 30. In order to exercise control over lateral movement or creep of the sheet material 29 with respect to the surface of the blanket on which the material is supported, the aforesaid member 41 is supported at one end for pivotal movement about a substantially vertical axis so that the longitudinal axis of the idler roll 37 may be adjusted angularly with respect to the longitudinal axis of the material. To this end, the left end of the member 41, as seen in Figs. 1 and 4, is provided with an enlarged substantially disc-shaped bearing plate 50 which is adapted to bear upon the upper surface of a base plate 52 fixed to the base 10 adjacent the right-hand end thereof, the bearing plate 50 being mounted on the base plate 52 for pivotal movement relative thereto by means of a substantially vertical stud 53.

To control the angular adjustment of the longitudinal axis of the idler roll 37 with respect to the longitudinal axis of the sheet material, the right-hand portion of the member 41, as seen in Fig. 1, may be engaged on opposite sides, respectively, by collars 54—54, Figs. 1 and 2, secured in spaced relationship on a shaft 55 which is threaded adjacent its ends for engagement with internally threaded apertures in upstanding supporting brackets 56—56 secured to the base 10 of the machine. One end of the shaft 55 is provided with a handwheel 57 for rotating the shaft. As shown especially well in Fig. 2, each collar 54 has a substantially frusto-conical face which is arranged to bear against the corresponding outer side wall of the member 41 for turning the latter about its stud 53. Thus, rotation of the shaft 55 in one direction will cause one of its collars 54 to bear against the corresponding side of member 41 and swing it about its stud in a direction corresponding to the direction of movement of the collar. By rotating the shaft 55 in the opposite direction, the member will be urged by the other collar 54 to swing in the opposite direction. In this manner, lateral creep of the sheet material relative to the longitudinal axis of the blanket can be corrected.

The above-described structure, that is to say, the endless, elastic blanket 30, the idler roll 37 carried by the carriage 38, the motor-driven carriage screw 42 and the shaft 55, all constitute elements of the apparatus for carrying out the invention to control the material feed rate and lateral adjustment and therefore the registration of successive stencils printed on the sheet material by successive runs through the machine. Referring now to the operation of this apparatus, the reversible motor 49 for driving the screw 42 is connected to a suitable source of energy and controlled by a manually-operated switch, not shown, for energizing the motor to rotate its shaft in either direction, the motor switch also having neutral position to shut off the motor. Assuming, then, that the motor 49 is energized to rotate its shaft clockwise as seen in Fig. 2, and that the sprocket 44 is driven therefrom correspondingly, the screw 42 will be rotated in a clockwise direction and cause the carriage 38 to move forwardly or to the right, as seen in Fig. 1. Consequently, the distance between the idler roll 37, carried by the carriage, and the impression roll 17 is increased, which results in an elongation of the resilient or expansible blanket 30, and a commensurate reduction in the thickness of the blanket. Inasmuch as the blanket is driven by the impression roll 17, the rotational speed of the blanket remains substantially constant. However, the linear speed of the supporting or outer surface of the blanket is a function of its radial distance from the center of the impression roll 17. Consequently, a reduction in the thickness of the blanket effects a corresponding reduction in the radial distance of its supporting surface from the center of the impression roll and hence a reduction in the linear speed thereof. On the other hand, if the direction of rotation of the motor shaft is reversed so that the screw 42 rotates counterclockwise to cause the carriage 38 to move to the left, as seen in Fig. 1, the tension on the resilient blanket 30 is lessened, whereby it is permitted to contract longitudinally, the contraction of the blanket being accompanied by a commensurate increase in thickness. This increase in thickness of the blanket increases the radial distance of its supporting surface from the center of the impression roll 17, as a consequence of which the linear speed of the supporting surface is increased, although the rotational speed of the blanket driving roll 17 remains constant. The amount of thickness variation that will be permitted in a given resilient blanket will depend upon the initial thickness, length and composition of the blanket as manufactured. In the particular application described herein, the range of thickness variation for the blanket 30 covers approximately one-eighth of an inch which will normally be sufficient for the close control desired.

As has been pointed out hereinbefore, the sheet material 29 is drawn off the supply roll 31 by the bite formed between the pressure roll 18 and the outer surface of the driven blanket 30. In this connection, it will be recalled that the pressure roll 18 is supported for free rotation and, moreover, is of a relatively soft, resilient material. Consequently, the soft resilient surface of the pressure roll 18 will respond readily to any variation in the thickness of the blanket 30, thereby maintaining a substantially uniform bite between the pressure roll and blanket at all times. Moreover, since the pressure roll is a freely rotating roll, its speed of rotation automatically adjusts to the increase or decrease in the linear speed of the outer surface of the blanket. Thus, an increase or decrease in the linear surface speed of the blanket effects a corresponding change in the linear speed or feed rate of the sheet material 29 being fed by the blanket to the screen drum 16. But inasmuch as the screen drum 16 is rotated at a substantially constant speed which is determined by the constant speed of rotation of the impresison roll 17, a change in the linear speed of the sheet material will effect a longitudinal adjustment of any given point on the material relative to a fixed element of the screen drum as, for example the edge of the squeegee blade 28. Since the latter serves to force the ink or colored pigment through the stencil screen 27, it may be regarded as indicative of the position of the stencil at the time of printing, and hence longitudinal adjustment of any point on the sheet material relative thereto effects a corresponding change in the position of the stencil printed on the material.

The operation of the rotary screen printing machine in conjunction with the material feed rate and stencil registration control means of the invention can be described briefly as follows. Let it be assumed that a length of sheet material 29 is to have a multi-color stencil bas-relief design printed thereon by successive passes through the printing machine, and that one of the stencils of the multi-color design has been printed on the material and the latter rewound to form the supply roll 31. The material is again fed from the supply roll 31 into the printing machine, and from thence to the dryer 34 and wind-up roll 36. The stencil screen 27 on the drum 16 has been changed to provide the second stencil of the multi-color design being printed. The motor 21 is now energized to drive the impression roll 17, screen drum 16 and resilient blanket 30 to move the sheet material longitudinally beneath the screen drum to receive the second stencil. On this second pass of the material through the machine, there will be, in almost every case, some inaccuracy in registration of the first and second stencils due to stretch or shrinkage of the material or a change in the tightness of the rewound supply roll. Referring to Fig. 6, let it be assumed, for example, that the position of the first stencil on the sheet material is indicated by the index line *a*, and that the position of the second stencil is indicated by the broken line *b*, that is to say, the first stencil *a* is ahead of the squeegee blade 28 of the screen drum at the time the squeegee is printing the second stencil on the material. When this condition is noticed by the attendant, he energizes the reversible motor 49 of the control means and allows the motor to run briefly in the direction which causes the resilient blanket 30 to be stretched. This decreases the linear speed of the sheet supporting surface of the blanket resulting in a corresponding decrease in the speed or feed rate of the sheet material 29. The screen drum 16 will continue to rotate at a substantially uniform speed and, consequently, as the linear speed of the sheet material decreases, the first stencil *a* will be made to arrive opposite the squeegee blade 28 at the moment the latter is printing the second stencil on the material. Thus, in the example, lines *a* and *b* in effect are made to coincide, and the two stencils are brought into proper registration. If, on the other hand, the first stencil as indicated by line *a* is behind the printing of the second stencil as indicated by the broken line *c*, the attendant energizes the motor 49 and allows it to run briefly in the opposite direction so as to permit the blanket 30 to contract. This increases the linear speed of the sheet supporting surface of the blanket resulting in a corresponding increase in the speed or feed rate of sheet material 29 so that the first stencil *a* is made to arrive opposite the squeegee blade 28 at the moment the latter is printing the second stencil.

The control means described above not only permits very accurate registration of the successive stencils on the sheet material, but has the added important advantage of allowing the control to be maintained while the machine is in operation. This means that continuous and immediate correction can be made throughout the printing operation whenever a lack of proper registration is noted. In this connection, the control means may be under the supervision of an attendant who observes the degree of registration of the successive stencils, or may be automatically operated by means of a photoelectric eye or equivalent supervisory means.

As previously noted, the squeegee blade 28 may be provided with mechanical means to raise and lower it to clear the relatively thick drum wall 26 of the screen drum. Such a mechanical means serves to prevent excessive wear on the blade and, accordingly, a practical embodiment is illustrated in Figs. 1, 3 and 8 of the drawings. Rigidly secured to the screen drum supporting shaft 13 are a pair of castings 60, spaced from one another as shown in Fig. 3. Castings 60 are formed with outwardly extending coplanar arms 61, 62, and the upper arms 62 have secured thereto air cylinders 63. Each air cylinder has a spring biased plunger 65 extending therefrom, and the outer ends of these plungers are secured to a pair of block members 66 integral with a horizontal channel member 67. The squeegee blade 28 is force fitted into the channel of member 67 and is provided with a pair of baffle or wall members 68 at each end thereof to prevent the ink or pigment from splashing around the ends of the blade. Arms 61 of the castings 60 are provided with rollers 69 which abut the sides of member 67 to help maintain the blade 28 steady and relieve some of the strain on the supporting plungers 65.

Air under pressure in the cylinders 63 normally holds the squeegee blade 28 in its lowermost position against the inner surface of the stencil screen 27. However, when the air supply is cut off, the plunger springs 70, Fig. 1, located within the cylinders 63, cause the plungers 65 to retract and raise the blade 28 sufficiently to clear the edge 71, Fig. 1, of the drum wall 26. As soon as the edge 71 of the drum wall has rotated past the squeegee blade, air under pressure again enters the cylinders 63 to force the blade down. In its held down position the blade will simply drop off the trailing edge of drum wall 26 as it rotates past, and abut the inner screen surface as shown. The air under pressure is supplied to the cylinders 63 through a pair of conduits 72, Fig. 3, connected to a valve mechanism 73 by means of a conduit 74 which enters the screen drum through the fixed spider bearing 24*a*. Air from a supply source, not shown, is conducted to the valve 73 through a conduit 76, Fig. 8, and a conventional valve element, not shown, within the valve is normally positioned to cause conduit 76 to communicate with conduit 74. A cam 77, having a single cam lobe 78, is secured as shown in Fig. 3 to the plate gear 23 of the screen drum 16 for rotation therewith. Just before the edge 71 of the drum wall 26 reaches squeegee blade 28 on each revolution of the screen drum, the cam lobe 78 engages a roller 79 to depress the roller supporting end of a spring biased lever 80 pivotally mounted on valve 73. The opposite end of lever 80 is operably connected by conventional mechanical linkage, not shown, to the valve element in valve 73 so that when the lever 80 is rocked by the action of the cam 77 the valve element is shifted and the air supplied by conduit 76 is exhausted through the port 82. This cuts off the air supply to the cylinders 63 and allows the plungers 65 to raise the squeegee blade 28 as previously described. As soon as cam lobe 78 rotates beyond the roller 79, the valving is again shifted to supply air to the cylinders 63 and lower the blade 28.

Referring now to Fig. 9, a modification of the apparatus of the invention is shown wherein a non-elastic belt 84 is positioned over the elastic blanket 30 on the impression roll 17. Such a non-stretchable, hard-surfaced belt has been found to be better adapted than the expansible blanket to carry, directly in contact therewith, easily distortable sheet materials such as silk, rayon or others of the lighter textile fabrics. In addition, it is possible to temporarily anchor a delicate fabric to the non-stretchable belt 84 to prevent either longitudinal or lateral distortion while an operation such as stencil printing is being performed on the fbaric. At the same time, the feed rate of the material can be closely controlled as previously described by means of the underlying elastic blanket 30, idler roll 37 and the mechanism for moving roll 37 to stretch or contract the blanket. To this end, the endless belt 84 is provided with a resilient take-up means, generally indicated at 85, so that it can automatically adjust to any change in the blanket 30. The take-up means 85 comprises a pulley or roll 86, around which the right end of belt 84 is passed, and a pair of brackets 87, only one of which is shown, rotatably supporting the roll shaft 88. Each bracket 87 is provided with a pair of smooth bores to receive the smooth shafts respectively of a pair of pins 89 threaded into a fixed member 90. Springs 92 are positioned on the pins 89 between the pin heads and brackets 87, while springs 93 are positioned on the pins between the brackets and member 90. The force exerted by springs 92 on brackets 87 is normally slightly greater than the force exerted by springs 93. In other words, brackets 87 are normally biased slightly towards fixed member 90 so that whenever the elastic blanket 30 is made thinner the take-up means will cause belt 84 to immediately follow. On the other hand, when blanket 30 is permitted to thicken, the resilient force exerted by the blanket in expanding plus the force of springs 93 will be sufficient to overcome the balance of force normally in favor of springs 92 and cause the belt 84 to follow in the opposite direction.

From the foregoing detailed description it will be apparent that the invention provides a novel control means for permitting accurate regulation of the rate of feed of a sheet material to a station at which an operation is to be performed on the material. While described herein in connection with a rotary screen printing operation, the method and apparatus disclosed can be advantageously used in other similar operations as, for example, a Sanforizing or a web cutting operation. In addition, the invention has utility in operations such as offset printing where the endless, elastic blanket and blanket thickness controlling mechanism can be applied to the plate or impression cylinders to vary the pressure between them and the blanket cylinder and thereby control the length of the print image. In all of these uses, the control means of the invention has the important advantage of permitting necessary adjustments during the operation of the process which have not heretofore been permitted by any practical method.

This invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In an apparatus for controlling the feed rate of sheet material to a station at which an operation is to be performed on the material, a roll adjacent the operating station driven at a uniform speed, an elastic sheet material supporting member of substantial thickness and capable of substantial elongation to produce a change in such thickness on the order of one-eighth of an inch, said member engaging said roll and driven thereby to deliver the sheet material to the operating station, and means for elongating said elastic member to produce said substantial change in its thickness, whereby to vary the linear speed of the sheet material delivered to the operating station.

2. An apparatus for controlling the feed rate of sheet material to a station at which an operation is to be performed on the material comprising; a roll rotatably supported adjacent the operating station; drive means for rotating said roll at a uniform speed; an idler roll spaced from said driven roll; an endless, elastic sheet material supporting member of substantial thickness and capable of substantial elongation to produce a change in such thickness on the order of one-eighth of an inch, said member being trained around said idler roll and said driven roll so as to be driven by the latter to deliver the sheet material to the operating station; and means adapted to move said idler roll towards or away from said driven roll a substantial distance for elongating said elastic member to produce said substantial change in its thickness and thereby vary the linear speed of the sheet material delivered to the operating station.

3. An apparatus as defined in claim 2; wherein said idler roll adjustment means includes a motor driven, reciprocable carriage on which said idler roll is rotatably supported.

4. An apparatus as defined in claim 2; including a non-elastic belt positioned over said supporting means at said driven roll, and means to permit said belt to adjust to any variation in the thickness of said supporting member.

5. An apparatus for feeding sheet material to an operating station comprising; complementary rolls each supported for rotation on a shaft, said shafts being substantially parallel and so spaced as to urge the surfaces of said rolls into contact whereby rotation of one of said rolls effects the rotation of the other; positive driving means for rotating one of said rolls at a constant speed; said complementary rolls being adapted and arranged to receive the sheet material in their bite and to cause it to be advanced by frictional engagement therewith upon rotation of said rolls; and control means to vary the linear speed of advance of said sheet material, without any change in the speed of said driving means, comprising a relatively thick, expansible and contractible endless sheet material supporting belt engaging said positively driven roll at one end of its run, an idler roll over which said belt passes at the other end of its run, and power operated means for effecting the expansion and contraction of said supporting member radially of said driven roll by substantially decreasing and increasing, respectively, the distance between said driven and idler rolls.

6. In a printing machine having a rotatable drum for printing on sheet material; drive means for rotating said drum at a uniform speed; and control means to vary the linear speed of said sheet material relative to said rotating drum comprising spaced parallel rolls, at least one of which is driven by the drive means of said drum, an endless elastic sheet material member of substantial thickness and capable of substantial elongation to produce a change in such thickness on the order of one-eighth of an inch, said member being trained about said parallel rolls and driven thereby for supporting said sheet material and moving it relative to said drum, and means for varying the distance between said rolls to cause, selectively, elongation and contraction of said elastic member to produce said substantial change in its thickness, whereby to vary the surface speed thereof relative to said drive means and rotary drum.

7. In a printing machine having a rotatable screen drum for stencil printing on sheet material; an impression roll adjacent said screen drum; means to rotate said impression roll and screen drum at a constant speed; an idler roll spaced from said impression roll; a reciprocable carriage supporting said idler roll; an endless, elastic sheet material supporting blanket of substantial thickness and capable of substantial elongation to produce a change in thickness on the order of one-eighth of an inch, said blanket being trained around said idler roll and impression roll and driven by the latter to feed sheet material to said screen drum; and power operated means adapted to selectively move said carriage towards or away from said impression roll to contract or stretch said blanket to produce said substantial change in its thickness, whereby to vary the surface speed thereof, and accordingly the linear speed of the sheet material carried thereby, relative to said screen drum.

8. A method of varying the linear speed of sheet material being delivered to an operating station which comprises holding said material against an endless elastic blanket trained around spaced parallel rolls, said blanket being of substantial thickness and capable of substantial elongation to produce a change in such thickness on the order of one-eighth of an inch, driving at least one of said rolls at a substantially uniform speed to cause said blanket to travel around said rolls and to feed said sheet material to said operating station, and selectively moving one of said rolls toward and away from the other to cause said blanket to expand and contract, respectively, with changes in the elongation thereof to produce said substantial change in thickness of said blanket and thereby vary the surface speed of said blanket, and consequently of the sheet material being moved thereby, without varying the rotational speed of said rolls.

References Cited in the file of this patent

UNITED STATES PATENTS

| | | |
|---|---|---|
| 497,953 | Duncan | May 23, 1893 |
| 670,107 | Lambert | Mar. 19, 1901 |
| 974,607 | Smith | Nov. 1, 1910 |
| 1,011,508 | Smith | Dec. 12, 1911 |
| 1,855,525 | MacArthur | Apr. 26, 1932 |
| 2,120,735 | Debrie | June 14, 1938 |
| 2,158,027 | Bulford | May 9, 1939 |
| 2,240,249 | Wickwire | Apr. 29, 1941 |
| 2,521,691 | Corlett | Sept. 26, 1950 |